United States Patent [19]

Desanzo

[11] 3,995,087
[45] Nov. 30, 1976

[54] LAMINATE FOR FORMING TEAR-RESISTANT LABELS

[75] Inventor: Dirk J. Desanzo, Northampton, Ohio

[73] Assignee: Morgan Adhesives Company, Stow, Ohio

[22] Filed: June 23, 1975

[21] Appl. No.: 589,049

[52] U.S. Cl. .............................. 428/315; 428/40; 428/216; 428/310; 428/354; 428/480; 428/516; 428/910
[51] Int. Cl.² ............................................. B32B 3/26
[58] Field of Search ............... 428/40, 41, 213, 214, 428/215, 216, 310, 315, 352, 354, 480, 483, 516, 906, 910

[56] References Cited
UNITED STATES PATENTS

| | | |
|---|---|---|
| 3,173,826 | 3/1965 | Campbell et al. ................ 428/310 |
| 3,467,569 | 9/1969 | Weber et al. ..................... 428/315 |
| 3,503,842 | 3/1970 | Kahn................................. 428/216 |
| 3,509,991 | 5/1970 | Hurst................................. 428/354 |
| 3,600,267 | 8/1971 | McFedries, Jr. et al............ 428/214 |
| 3,682,764 | 8/1972 | Findlay et al. .................... 428/214 |

Primary Examiner—William J. Van Balen
Attorney, Agent, or Firm—Oldham & Oldham Co.

[57] ABSTRACT

The laminate comprises a foamed polypropylene top layer adapted to have printed data applied thereon, a releasable backing layer, and a center layer of a tear resistant polyester film or biaxially oriented polypropylene film bonded on opposite faces thereof to the top and backing layers.

3 Claims, 1 Drawing Figure

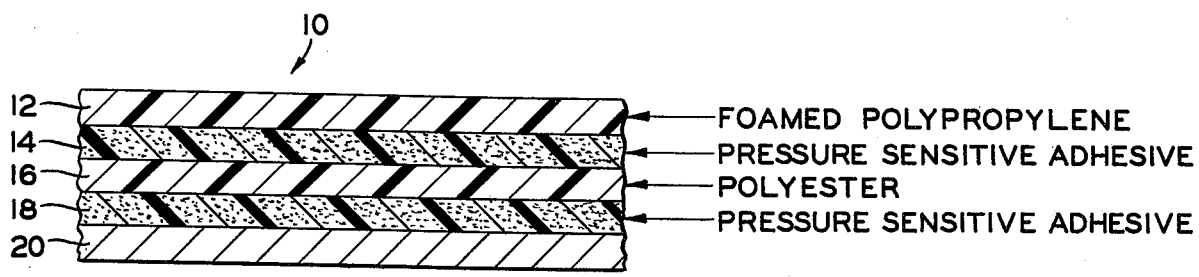

LAMINATE FOR FORMING TEAR-RESISTANT LABELS

BACKGROUND OF INVENTION

Heretofore there have been many different types of laminates provided for forming labels and wherein the laminate would be provided with a pressure sensitive adhesive layer thereon normally having a backing sheet applied thereto. Hence, in use of the laminate, it is usual to have printed data applied to the face or top sheet in the laminate, the laminate is cut to desired label width, and provided to the end user in suitable roll or other bulk form for removing the backing sheet material and applying the labels to the individual articles.

Naturally in the production of any type of a label material, it is desirable that the label be provided at low cost, that it be tear-resistant, the label should take all normal printing inks readily, and the label forming laminate should be easy to process, control and use.

The general object of the present invention is to provide a novel and improved laminate for use in forming tear-resistant labels therefrom and wherein the laminate includes a center layer of a tear-resistant polyester film.

Another object of the invention is to provide the label forming laminate comprising a foamed polypropylene top layer adapted to have printed data applied thereon and with a backing layer being secured to the top layer by a pressure sensitive adhesive and with the backing or reinforcing layer comprising a tear-resistant polyester film, such as one made from Mylar.

Yet another object of the invention is to provide a label forming laminate wherein the components thereof can be conventionally processed and laminated by existing apparatus and be easy to form, cut and use.

The foregoing and other objects and advantages of the invention will be made more apparent as the specification proceeds.

Reference now is made to the accompanying drawing which show a cross section through the laminate embodying the principles of the invention.

In the drawing, the various layers thereof are shown of exaggerated thicknesses since all of such layers normally are in the vicinity or range of from about 0.001 to about 0.005 inch in thickness. Corresponding numerals are used to refer to corresponding members or layers shown in the drawing and referred to in the specification to facilitate comparison therebetween.

The laminate of the invention is indicated as a whole by the numeral 10. Such laminate is particularly adapted to be processed to have printed data to the exposed top surface or face thereof, the laminate can be cut to individual labels and be processed so as to be supplied to the end user for individual application of the labels to desired articles.

The laminate 10 comprises a face or top layer 12 made from a foamed polypropylene film and it is provided on the back or underface thereof with a layer of a conventional pressure sensitive adhesive material 14. Such layer of pressure sensitive adhesive is bonded on its other face to a center reinforcing or tear-resistant layer 16. This center layer is made from a tear-resistant polyester material, such as polyethylene terephthalate, biaxially oriented polypropylene, etc. wherein the film of material has the desired toughness and tear resistance. Obviously, the polyester used should be compatible with conventional pressure sensitive adhesives and with the other materials, particularly the foamed polypropylene used in the laminate.

The opposite face of the center layer 16 has a layer 18 of a conventional pressure sensitive adhesive provided thereon and a releasable backing sheet 20 is attached to the remaining face or surface of the pressure sensitive adhesive layer 18. Obviously, such backing layer 20 is provided with a coating (not shown) of a release material on the surface thereof adjacent the pressure sensitive adhesive layer 18 whereby the backing layer can be released or disengaged from the adhesive layer 18 readily when desired. Any conventional release coating is provided on the backing layer 20 to contact the adhesive layer 18.

The backing sheet or layer 20 is usually a paper sheet and the release usually is a silicone composition.

By provision of the laminate 10, it can be substantially conventionally formed from the usual processes for depositing pressure sensitive adhesives onto the desired surfaces, the end laminate can have printed data applied to the exposed surface of the top layer or polypropylene film 12, and thereafter the laminate can be converted and/or processed in conventional manners so as to form die cut labels or the like wherein the end user of the laminate would remove the portion of the release or backing paper 20 on the back surface of the label provided and apply the label individually to the desired article or surface.

Hence, in view of the foregoing, it is believed that the objects of the invention have been achieved by the provision of an improved tear-resistant label forming laminate. Of course, the laminate could have other uses but it is particularly desirable to use the foamed polypropylene film in forming tear-resistant labels from the laminate provided.

Thus the objects of the invention are believed to have been achieved.

While one complete embodiment of the invention has been disclosed herein, it will be appreciated that modification of this particular embodiment of the invention may be resorted to without departing from the scope of the invention.

What is claimed is:

1. A laminate for use in forming tear-resistant labels comprising
    a foamed polypropylene top layer adapted to have printed data applied to its face surface,
    a releasable backing layer,
    a center layer of a tear-resistant polyester film or biaxially oriented polypropylene film, and
    layers of pressure sensitive adhesive bonding opposite surfaces of said center layer to said top layer or to said backing layer.

2. A laminate as in claim 1 where said center layer is made from polyethylene terephthalate.

3. A laminate as in claim 1 where said center layer film comprises biaxially oriented polypropylene.

* * * * *